Patented Apr. 4, 1950

2,502,897

UNITED STATES PATENT OFFICE 2,502,897

SULFOMETHYL DICYANDIAMIDE

James M. Smith, Jr., North Plainfield, N. J., assignor to American Cyanamid Company, New York, N. Y., a corporation of Maine No Drawing. Application October 10, 1946, Serial No. 702,372

1 Claim. (Cl. 260—513)

This invention relates to a new chemical compound, omega sulfomethyl dicyandiamide, and its inorganic salts, and to a method for producing such compounds.

The new compound, omega sulfomethyl dicyandiamide, has the probable formula: $NC-NH-C(=NH)-NH-CH_2SO_3H$. However, the position of the $-CH_2SO_3H$ group is not known and it might substitute one of the two imide hydrogens, though this is less likely. It may be prepared by warming dicyandiamide with an aqueous formaldehyde alkali bisulfite solution. The probable course of the reaction may be indicated as follows:

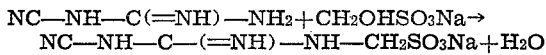

The product is suitably isolated as an alkali metal salt.

The sulfomethyldicyandiamide may be obtained by metathesis of its alkali metal salts by treating, for example, the sodium salt with a dilute solution of an acid, such as sulfuric or hydrochloric, and other acids capable of liberating sulfomethyl dicyandiamide as a weak acid.

The omega sulfomethyl dicyandiamide can be used in organic synthesis in the preparation of other valuable compounds. It is also useful as an intermediate in the manufacture of dyestuffs, particularly in the art of dyeing and printing ice colors. The alkali metal salts react with the ice color diazo components in alkaline medium to form stable condensation products which may be incorporated with one of the usual ice color coupling components together with various assistants such as starches, gums, alkali, and dispersing agents. The textile material is printed or impregnated with the mixture and then treated with acid, whereupon the sulfomethyl dicyandiamide condensation compound is hydrolyzed, and coupling to form the azo color is effected.

The invention will be described in greater detail in conjunction with the following examples which are typical illustrations. The parts are by weight.

Example 1

A solution of 104 parts of sodium bisulfite in water to give 325 parts, is heated to 60° C. and 30 parts of formaldehyde in 60 parts of water are added at such a rate that the temperature does not rise above 70° C. To the resulting solution is added 84 parts of dicyandiamide in about 10 minutes. This dissolves as added. The charge is kept at 60°–70° C. for about 30 minutes, and at 75°–95° C. for an additional 30 minutes. The solution is treated with 2 parts of sodium carbonate and is clarified. When chilled in the ice bath to 5°–10° C. for several hours, a white material precipitates. This is collected on the filter and dried at 40° C. for 10 hours. The material is purified by recrystallization from dilute alcohol.

This sodium salt of omega sulfomethyl dicyandiamide forms snow-white crystals not melting up to 250° C. At room temperature it is soluble in aqueous caustic alkali without decomposition.

Salts of the other alkali metals and the ammonium salt may similarly be obtained.

Example 2

In addition, the alkaline earth metal salts, such as for example, calcium and barium may be prepared by reacting an alkali metal salt, such as the sodium salt, of omega sulfomethyldicyandiamide with equivalent amounts of an inorganic alkaline earth metal salt, such as the chloride and filtering the precipitated alkaline earth metal salt of omega sulfomethyl dicyandiamide. Other metal salts of this compound such as copper, zinc, iron, and other heavy metals may be prepared by reacting an inorganic salt of the appropriate metal with the sodium salt of sulfomethyl dicyandiamide.

Its use in the stabilization of diazo compounds and in the printing of azoic colors is illustrated by Example 3.

Example 3

To a slurry of 15.5 parts of 2-methyl-5-chloroaniline hydrochloride (91.8% pure) in 100 cc. of water are added 35 parts of 17% hydrochloric acid. The mixture is cooled to 2–3° C. by the addition of flake ice, and is diazotized with 5–6 parts of sodium nitrite. The resulting mixture is added directly to a solution of 28.8 parts of sodium sulfomethyl-dicyandiamide in 200 parts of water and 100 parts of ice, with about 50 parts of 20% sodium hydroxide solution. The temperature is raised to about 30° C. in ten minutes. Six parts of 20% sodium hydroxide solution are added and the solution is clarified. The filtrate is treated with 110 parts of sodium chloride, and acetic acid is added to reduce the alkalinity until just neutral to phenolphthalein test paper. The yellow precipitate is collected on the filter and dried. The product is soluble in dilute sodium hydroxide solution.

A mixture of 4.93 parts of the stabilized diazo product above and 2.9 parts of the ortho-toluidide of 2-hydroxy naphthalene 3-carboxylic acid is slurried in Cellosolve, treated with sodium hydroxide and water, and mixed with starch tragacanth gum. The resulting paste is printed on cotton cloth in the usual manner. On drying, the red color begins to develop. On aging in steam containing acetic acid vapor, a strong red shade pattern is produced on the cloth.

I claim:

As a new chemical compound, an omega-sulfomethyl dicyandiamide having the formula:

$$NC-HN-C(=NH)-NH-CH_2SO_3M$$

in which M is an inorganic cation.

JAMES M. SMITH, Jr.

REFERENCES CITED

The following references are of record in the file of this patent:

UNITED STATES PATENTS

| Number | Name | Date |
|---|---|---|
| 2,207,603 | Wesche | July 9, 1940 |
| 2,213,474 | Puetzer | Sept. 3, 1940 |
| 2,230,965 | Orem | Feb. 4, 1941 |
| 2,251,234 | Swain | July 29, 1941 |
| 2,332,388 | MacKenzie | Oct. 19, 1943 |
| 2,455,807 | Redmon et al. | Dec. 7, 1948 |